United States Patent
Shin

(10) Patent No.: US 7,207,093 B1
(45) Date of Patent: Apr. 24, 2007

(54) SNAP SWIVEL HAVING DECORATIVE EFFECT

(75) Inventor: Win-Pin Shin, Yuanlin Chen (TW)

(73) Assignee: Cherng Shyang Chen Industry Co., Ltd., Yuanlin Chen (TW)

( * ) Notice: Subject to any disclaimer, the term of this patent is extended or adjusted under 35 U.S.C. 154(b) by 50 days.

(21) Appl. No.: 11/151,620

(22) Filed: Jun. 13, 2005

(51) Int. Cl.
    *A44B 13/00* (2006.01)
(52) U.S. Cl. .................... 24/600.4; 24/265 H
(58) Field of Classification Search ............. 24/600.4, 24/907, 265 H, 601.2, 318, 343, 363, 369; D8/367; 294/82.19, 82.2, 82.21, 82.23
See application file for complete search history.

(56) References Cited

U.S. PATENT DOCUMENTS

| 196,939 | A | * | 11/1877 | Sabin ...................... 24/265 H |
| 591,038 | A | * | 10/1897 | Goodwin ................... 24/265 H |
| 674,383 | A | * | 5/1901 | Jewell ........................ 24/600.4 |
| 714,348 | A | * | 11/1902 | Youngblood ................. 24/343 |
| 967,664 | A | * | 8/1910 | Peterson .................... 24/265 H |
| 1,286,566 | A | * | 12/1918 | Evenson ................... 24/265 H |
| 5,737,809 | A | * | 4/1998 | Driver ....................... 24/601.2 |

* cited by examiner

*Primary Examiner*—Robert J. Sandy
(74) *Attorney, Agent, or Firm*—Alan D. Kamrath; Nikolai & Mersereau, P.A.

(57) ABSTRACT

A snap swivel includes a main body, a mounting plate having a first surface mounted on a first surface of the main body, a first decorative plate mounted on a second surface of the main body, and a second decorative plate mounted on a second surface of the mounting plate. Thus, the first decorative plate and the second decorative plate are exposed outward from the main body and the mounting plate respectively so that the snap swivel has an outstanding appearance, thereby enhancing the aesthetic quality of the snap swivel.

16 Claims, 4 Drawing Sheets

SNAP SWIVEL HAVING DECORATIVE EFFECT

BACKGROUND OF THE INVENTION

1. Field of the Invention

The present invention relates to a quick-release snap swivel, and more particularly to a snap swivel having a decorative effect.

2. Description of the Related Art

A conventional snap swivel in accordance with the prior art shown in FIG. 4 comprises a main body 50 having a first end formed with a hook 52 and a second end formed with a mounting portion 54, and a loop 56 pivotally mounted on the mounting portion 54 of the main body 50. However, the main body 50 cannot provide any decorative effect, thereby decreasing the aesthetic quality of the snap swivel.

SUMMARY OF THE INVENTION

In accordance with the present invention, there is provided a snap swivel, comprising a main body, a mounting plate having a first surface mounted on a first surface of the main body, a first decorative plate mounted on a second surface of the main body, and a second decorative plate mounted on a second surface of the mounting plate.

The primary objective of the present invention is to provide a snap swivel having a decorative effect, thereby enhancing the aesthetic quality of the snap swivel.

Another objective of the present invention is to provide a snap swivel, wherein the first decorative plate and the second decorative plate are exposed outward from the main body and the mounting plate respectively so that the snap swivel has an outstanding appearance, thereby enhancing the aesthetic quality of the snap swivel.

A further objective of the present invention is to provide a snap swivel, wherein the first decorative plate and the second decorative plate are removed from the main body and the mounting plate respectively, thereby facilitating a user replacing the first decorative plate and the second decorative plate so as to fit the user's practical requirement.

Further benefits and advantages of the present invention will become apparent after a careful reading of the detailed description with appropriate reference to the accompanying drawings.

DETAILED DESCRIPTION OF THE INVENTION

Figure 1:
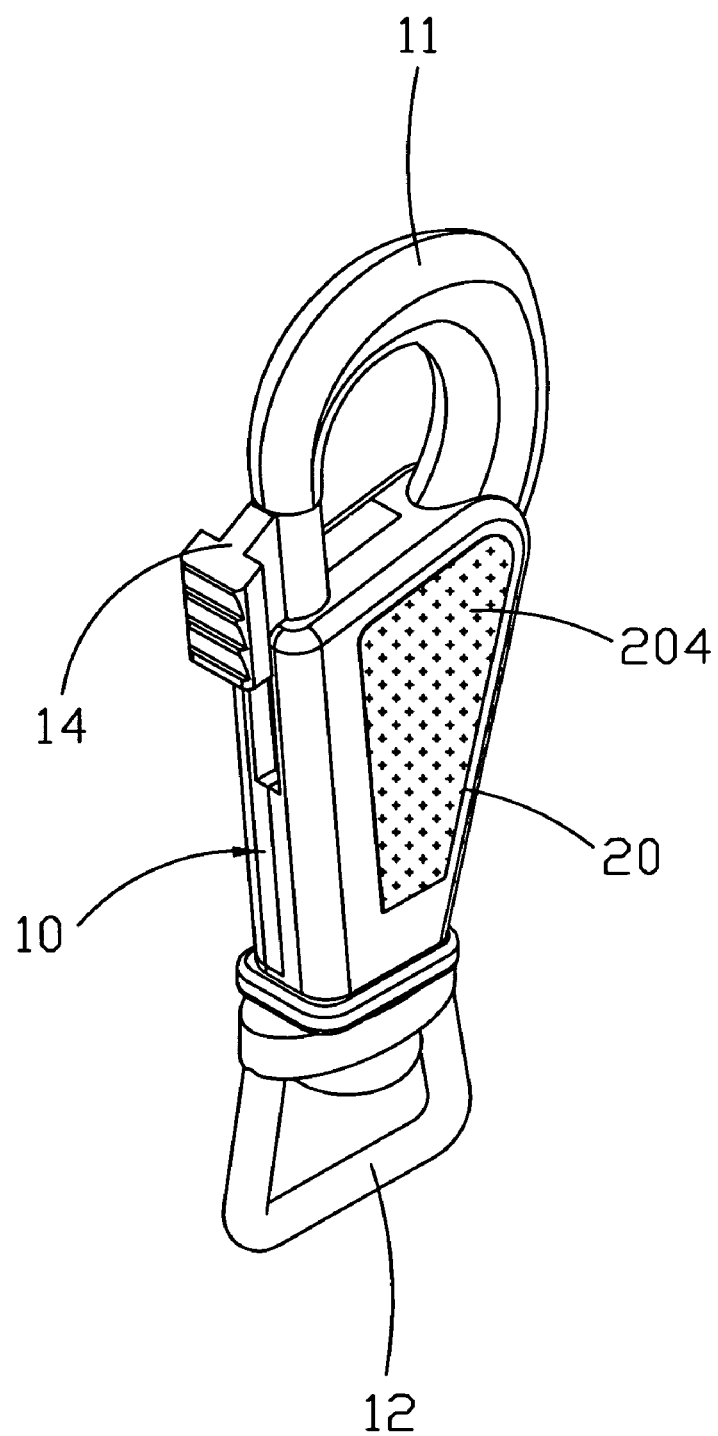
FIG. 1 is a perspective view of a snap swivel in accordance with the preferred embodiment of the present invention.
Figure 2:
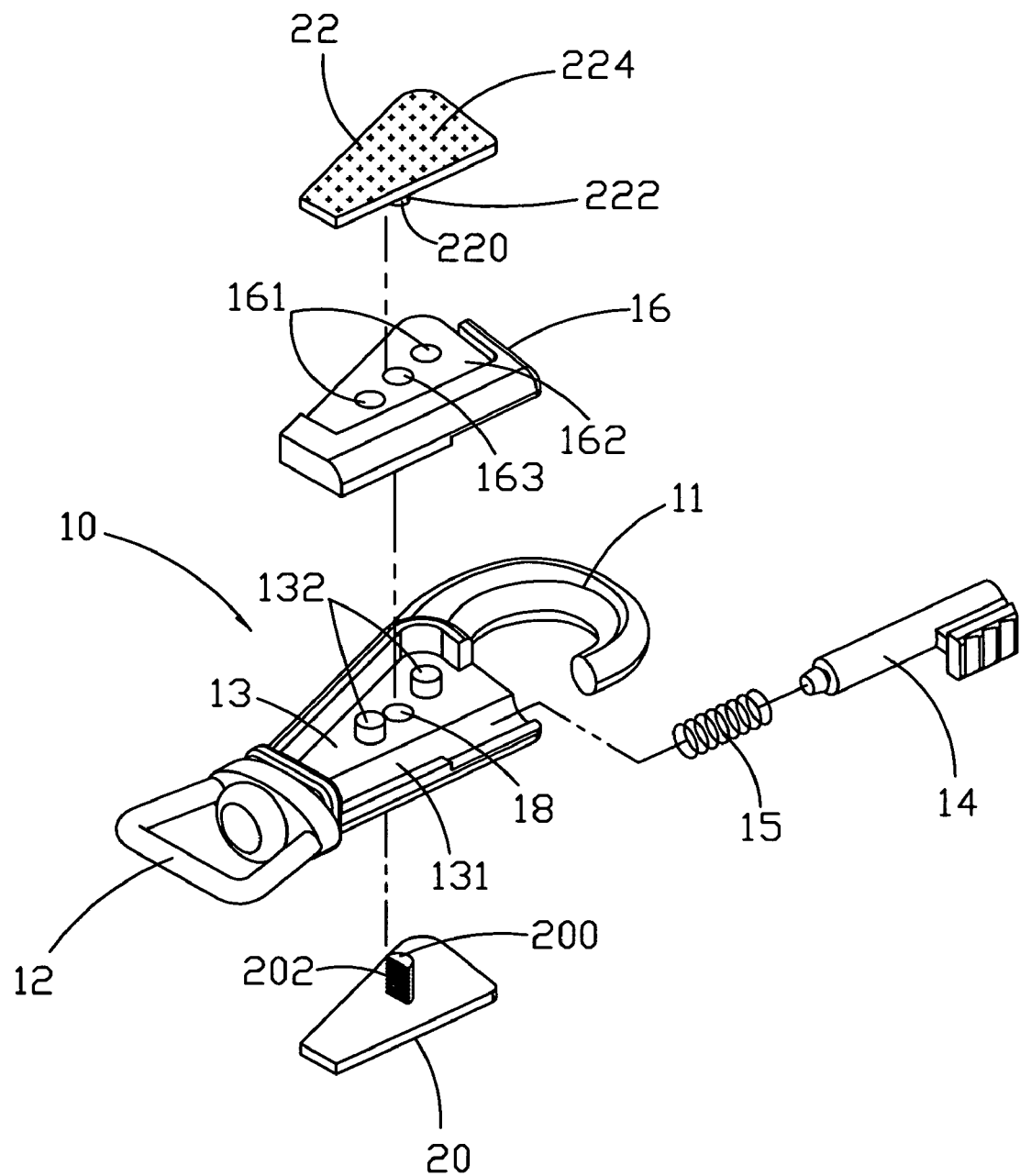
FIG. 2 is an exploded perspective view of the snap swivel as shown in FIG. 1.

Referring to the drawings and initially to FIGS. 1 and 2, a snap swivel in accordance with the preferred embodiment of the present invention comprises a main body 10, a mounting plate 16 having a first surface mounted on a first surface of the main body 10, a first decorative plate 20 removably mounted on a second surface of the main body 10, and a second decorative plate 22 removably mounted on a second surface of the mounting plate 16.

Figure 3:
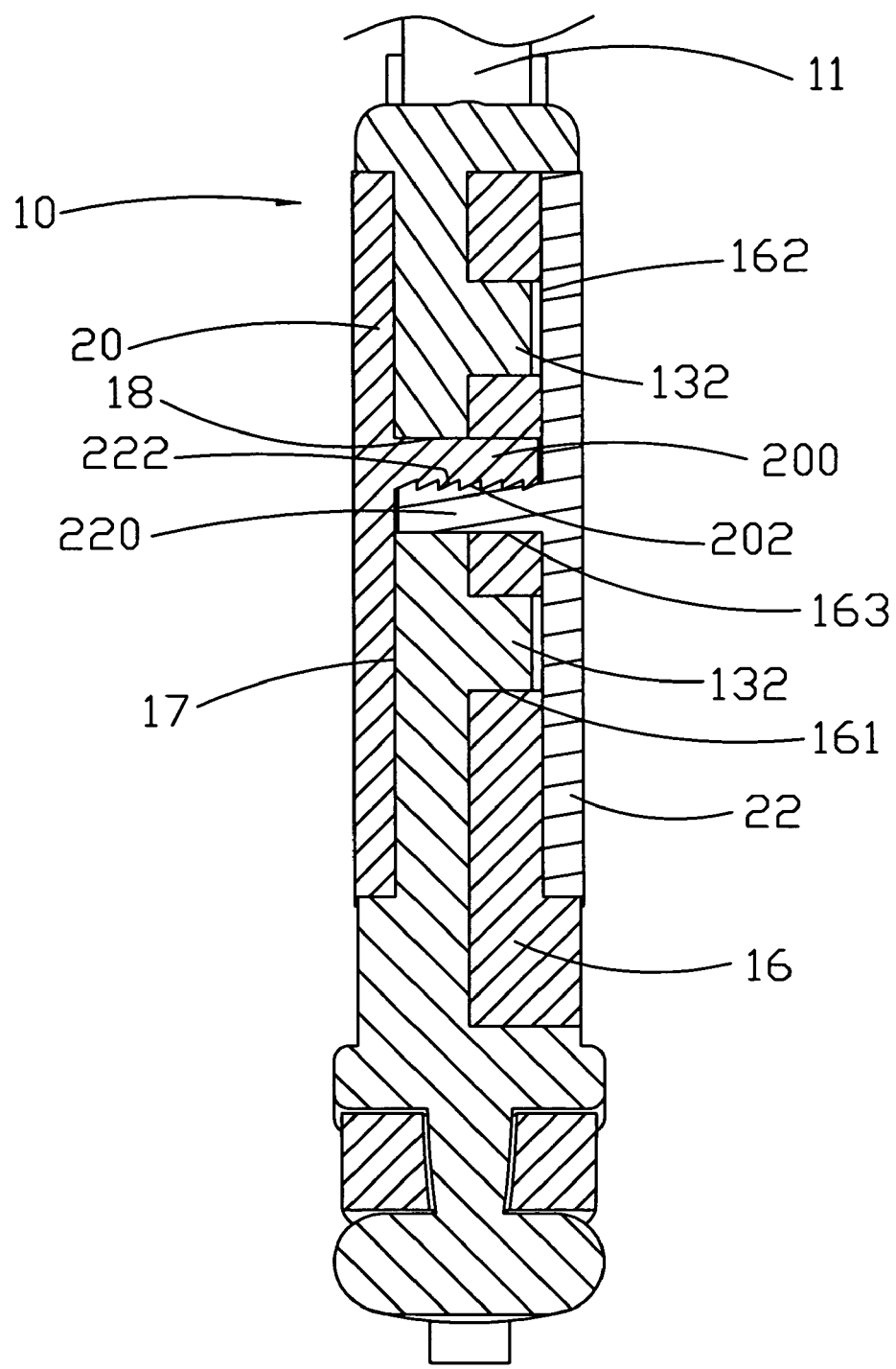
FIG. 3 is a plan cross-sectional view of the snap swivel as shown in FIG. 1.
Figure 4:
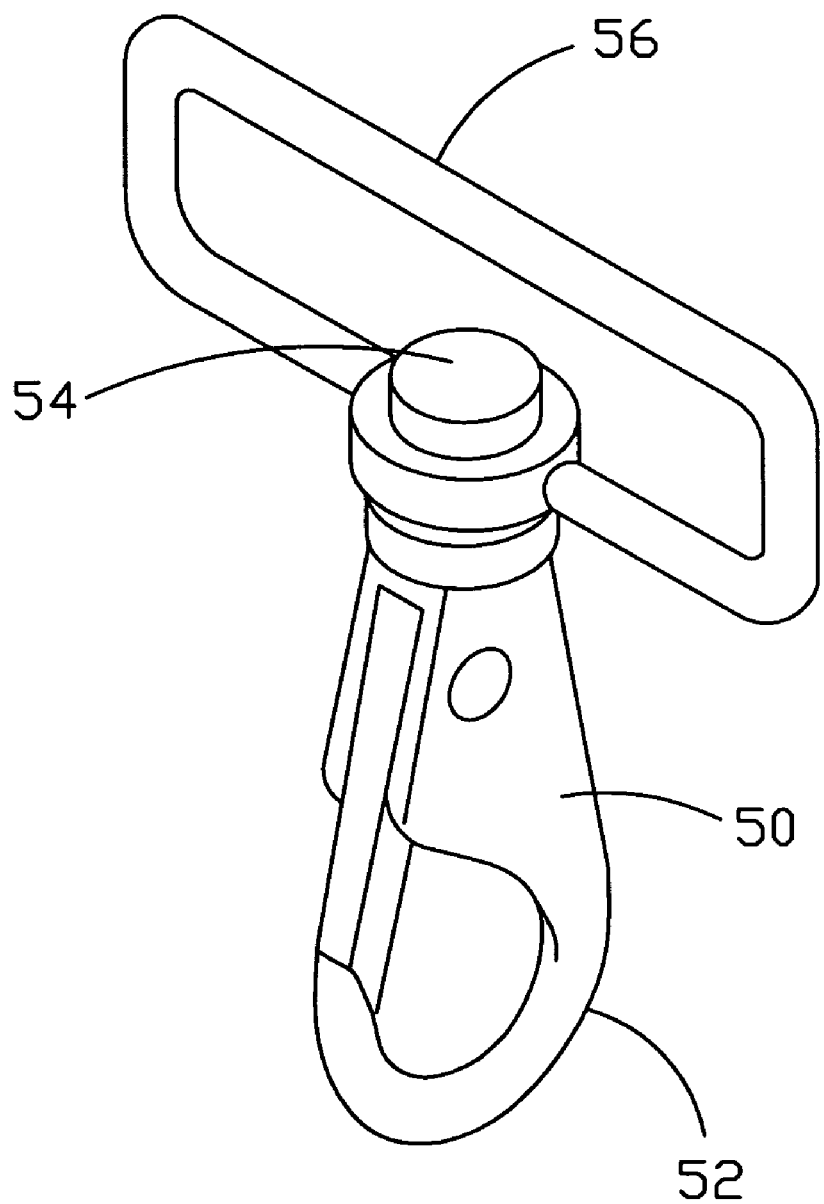
FIG. 4 is a perspective view of a conventional snap swivel in accordance with the prior art.

Referring to FIGS. 1–3, the first surface of the main body 10 is formed with a receiving chamber 13 for mounting the mounting plate 16, and the second surface of the main body 10 is formed with a mounting recess 17 (see FIG. 3) for mounting the first decorative plate 20. The main body 10 has a first end formed with a substantially C-shaped hook 11 and a second end formed with a loop 12. The main body 10 has a mediate portion formed with a substantially circular mounting hole 18 communicating with the receiving chamber 13 and the mounting recess 17. The receiving chamber 13 of the main body 10 has a face formed with two spaced fixing posts 132 and has a side formed with a slideway 131.

A push button 14 is movably mounted in the slideway 131 of the main body 10 and having a first end movable to rest on the hook 11 of the main body 10 as shown in FIG. 1, and an elastic member 15 is mounted in the slideway 131 of the main body 10 and biased between the main body 10 and a second end of the push button 14 to push the push button 14 toward the hook 11 of the main body 10.

The mounting plate 16 has a substantially circular mounting bore 163 communicating with the mounting hole 18 of the main body 10 and has two spaced fixing holes 161 for fixing the fixing posts 132 of the main body 10. The second surface of the mounting plate 16 is formed with a mounting recess 162 for mounting the second decorative plate 22.

The first decorative plate 20 has a first surface formed with a substantially semi-circular first locking post 200 extended through the mounting hole 18 of the main body 10 and the mounting bore 163 of the mounting plate 16 and a second surface provided with a plurality of designs 204 (see FIG. 1), such as patterns, characters or the like. The first locking post 200 of the first decorative plate 20 has a side formed with a first serrated portion 202.

The second decorative plate 22 has a first surface formed with a substantially semi-circular second locking post 220 extended through the mounting bore 163 of the mounting plate 16 and the mounting hole 18 of the main body 10 and engaged with the first locking post 200 of the first decorative plate 20 and a second surface provided with a plurality of designs 224, such as patterns, characters or the like. The second locking post 220 of the second decorative plate 22 has a side formed with a second serrated portion 222 engaged with the first serrated portion 202 of the first decorative plate 20. The second decorative plate 22 has a color different from that of the first decorative plate 20.

Accordingly, the first decorative plate 20 and the second decorative plate 22 are exposed outward from the main body 10 and the mounting plate 16 respectively so that the snap swivel has an outstanding appearance, thereby enhancing the aesthetic quality of the snap swivel. In addition, the first decorative plate 20 and the second decorative plate 22 are removed from the main body 10 and the mounting plate 16 respectively, thereby facilitating a user replacing the first decorative plate 20 and the second decorative plate 22 so as to fit the user's practical requirement.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A snap swivel, comprising:

a main body;

a mounting plate having a first surface mounted on a first surface of the main body;

a first decorative plate mounted on a second surface of the main body;

a second decorative plate mounted on a second surface of the mounting plate;

wherein the main body has a mediate portion formed with a mounting hole, the mounting plate has a mounting bore communicating with the mounting hole of the main body, the first decorative plate has a first surface formed with a first locking post extended through the mounting hole of the main body and the mounting bore of the mounting plate, and the second decorative plate has a first surface formed with a second locking post extended through the mounting bore of the mounting plate and the mounting hole of the main body and engaged with the first locking post of the first decorative plate.

2. The snap swivel in accordance with claim 1, wherein the first decorative plate is removably mounted on the second surface of the main body.

3. The snap swivel in accordance with claim 1, wherein the second decorative plate removably mounted on the second surface of the mounting plate.

4. The snap swivel in accordance with claim 1, wherein the main body has a first end formed with a substantially C-shaped hook and a second end formed with a loop.

5. The snap swivel in accordance with claim 1, wherein the mounting hole of the main body has a substantially circular shape.

6. The snap swivel in accordance with claim 1, wherein the mounting bore of the mounting plate has a substantially circular shape.

7. The snap swivel in accordance with claim 1, wherein the first locking post of the first decorative plate has a substantially semi-circular shape.

8. The snap swivel in accordance with claim 1, wherein the first decorative plate has a second surface provided with a plurality of designs.

9. The snap swivel in accordance with claim 1, wherein the second locking post of the second decorative plate has a substantially semi-circular shape.

10. The snap swivel in accordance with claim 1, wherein the second decorative plate a second surface provided with a plurality of designs.

11. The snap swivel in accordance with claim 1, wherein the first locking post of the first decorative plate has a side formed with a first serrated portion, and the second locking post of the second decorative plate has a side formed with a second serrated portion engaged with the first serrated portion of the first decorative plate.

12. The snap swivel in accordance with claim 1, wherein the second decorative plate has a color different from that of the first decorative plate.

13. A snap swivel, comprising:

a main body;

a mounting plate having a first surface mounted on a first surface of the main body;

a first decorative plate mounted on a second surface of the main body;

a second decorative plate mounted on a second surface of the mounting plate;

wherein the first surface of the main body is formed with a receiving chamber for mounting the mounting plate;

the receiving chamber of the main body has a face formed with two spaced fixing posts, and the mounting plate has two spaced fixing holes for fixing the fixing posts of the main body.

14. The snap swivel in accordance with claim 1, wherein the second surface of the main body is formed with a mounting recess for mounting the first decorative plate.

15. The snap swivel in accordance with claim 1, wherein the second surface of the mounting plate is formed with a mounting recess for mounting the second decorative plate.

16. The snap swivel in accordance with claim 1, wherein the first decorative plate and the second decorative plate are exposed outward from the main body and the mounting plate respectively.

* * * * *